Figure 4:
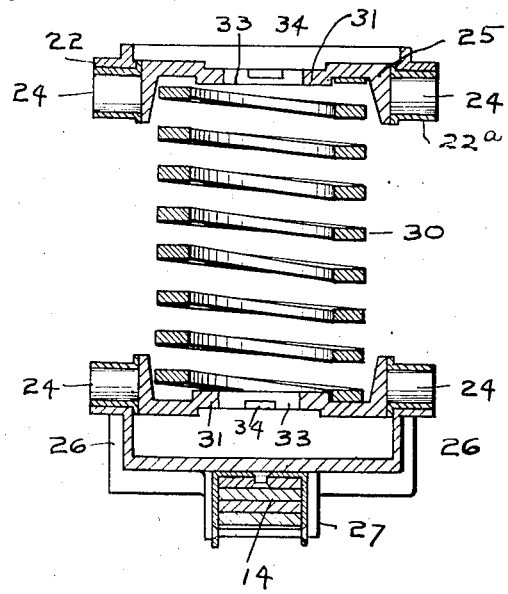

R. H. HASSLER.
VEHICLE SPRING.
APPLICATION FILED AUG. 19, 1913.
1,097,975.
Patented May 26, 1914.
3 SHEETS—SHEET 1.
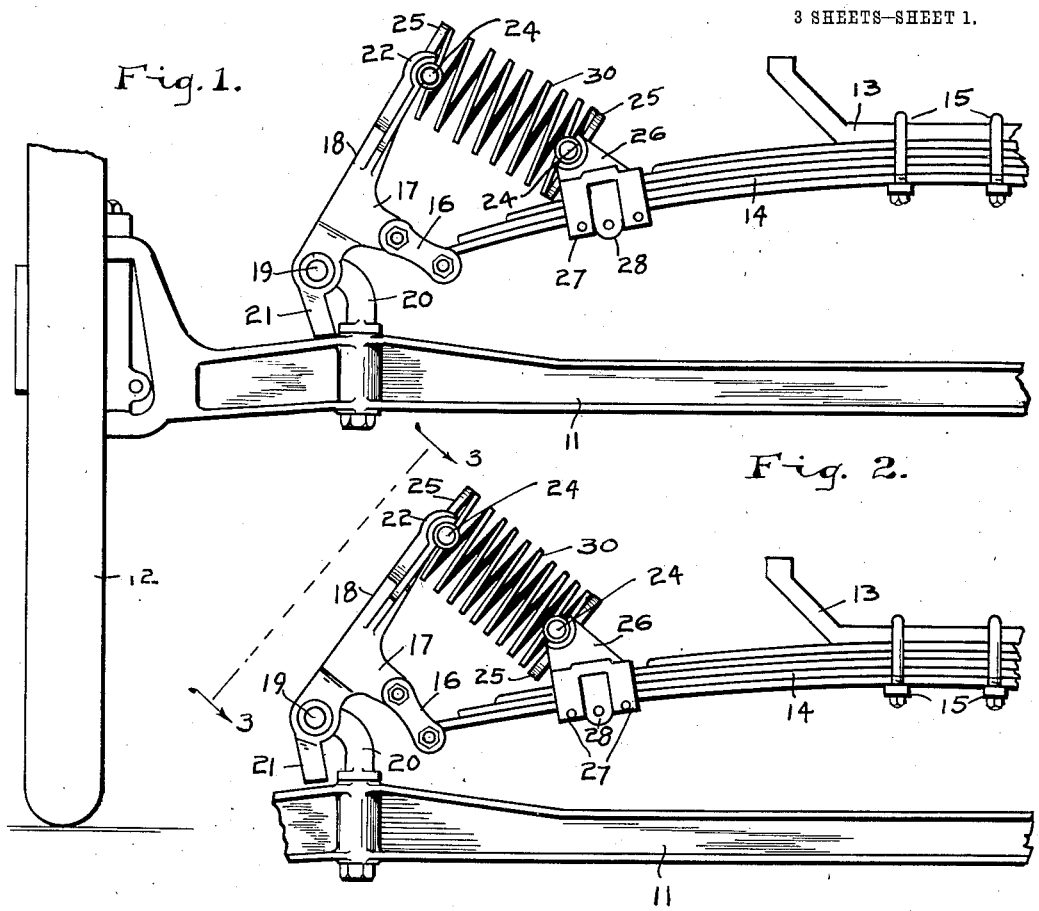
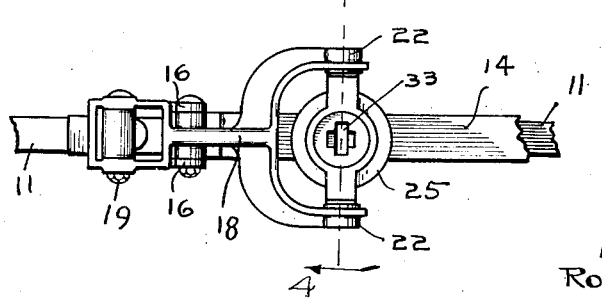
WITNESSES:
INVENTOR.
Robert H. Hassler
By Michum & Werner
ATTORNEYS.

R. H. HASSLER.
VEHICLE SPRING.
APPLICATION FILED AUG. 19, 1913.
1,097,975.
Patented May 26, 1914.
3 SHEETS—SHEET 3.
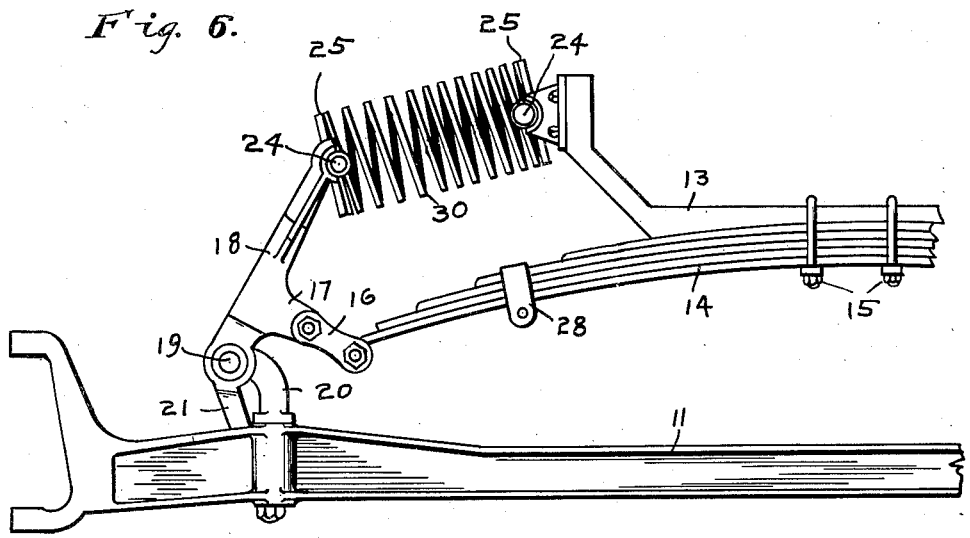
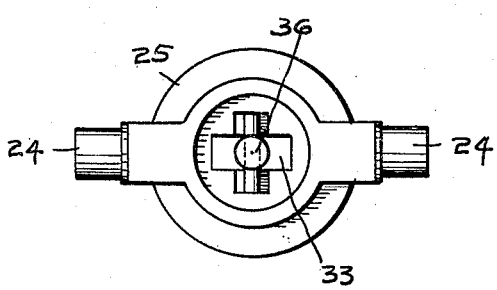
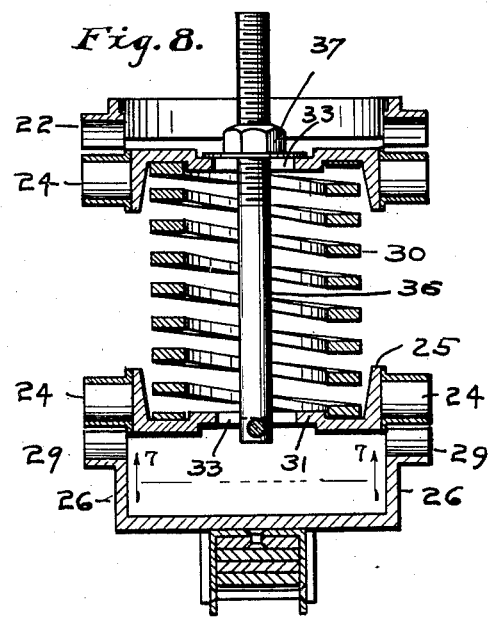
WITNESSES:
J. H. Swan.
B. T. Keler.
INVENTOR.
Robert H. Hassler.
By Miller & Woerner
ATTORNEYS.

UNITED STATES PATENT OFFICE.

ROBERT H. HASSLER, OF INDIANAPOLIS, INDIANA.

VEHICLE-SPRING.

1,097,975.  Specification of Letters Patent.  Patented May 26, 1914.

Application filed August 19, 1913. Serial No. 785,484.

*To all whom it may concern:*

Be it known that I, ROBERT H. HASSLER, a citizen of the United States, residing at Indianapolis, in the county of Marion and State of Indiana, have invented certain new and useful Improvements in Vehicle-Springs, of which the following is a specification.

This invention relates to an improved spring suspension for vehicles, in which a supplementary spring is used in conjunction with an ordinary vehicle spring. Where spiral supplementary springs have been used in such manner it has been necessary to string them on rods or to confine them in casings to keep them in proper shape and position.

Where special supplementary compression springs are used in the manner shown in my pending application Serial No. 763,763, in which one end of the spiral spring is fastened to a lever and the other end to a portion of the leaf spring, the spiral spring is given an oscillating movement. This oscillating movement is due to the elongation of the leaf spring under changes of load. The spiral spring has two movements,—one of compression and the other of oscillation. For this reason it is necessary that the plates against which the spiral spring bears be pivoted so as to always take a position normal to the spring axis,—all of which is shown in the drawings accompanying my said application No. 763,763.

I find that in practice certain forms of compression springs show a decided tendency to warp out of shape when used in that way. If the end bearing-plates become tilted on their pivots to an angle not normal to the spring axis the spring throws itself into a curved position,—that is, with its axis almost semi-circular, and this action sometimes snaps the springs out from between the end-plates. To overcome this objection and to permit of the use of compression springs of the most advantageous form, I have devised the structure shown in the accompanying drawings, in which—

Figure 5:
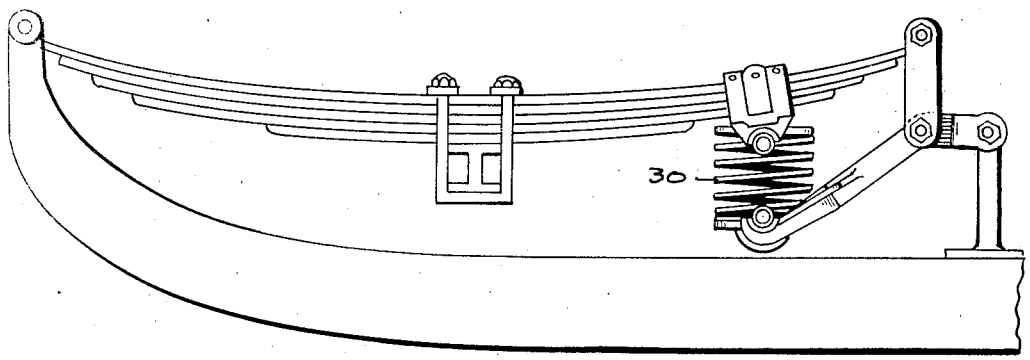

Figure 1 is a view in elevation of an axle and leaf spring showing my invention in the position of no load thereon. Fig. 2 shows the same parts under conditions of sufficient load to strain the leaf spring. Fig. 3 is a view of the parts as seen from the dotted line 3—3 of Fig. 2 looking in the direction of the arrows. Fig. 4 is a section on a larger scale taken on the line 4—4 of Fig. 3. Fig. 5 is a modified form in which my invention is applied to a leaf spring in reverse position to that shown in Figs. 1 and 2. Fig. 6 represents another modified form in which the bracket supporting the seat-plate for the coiled spring and which is supported upon the leaf spring is elongated. Fig. 7 is a top end view of the device shown in Fig. 8, and Fig. 8 is a section through the axis of a coiled spring showing the manner in which it is compressed by a bolt in the operation of assembling the spring and its associated parts.

Like characters of reference indicate like parts, throughout the several views of the drawings.

Referring to the drawings, 11 is a vehicle axle, 12 one of the vehicle wheels, 13 the frame or body portion of the vehicle, 14 a leaf or laminated plate spring supporting the frame from the axle. In the drawings this leaf spring is located transversely of the axis of the vehicle except in Fig. 5 and is fastened rigidly to the frame 13 by means of clips 15. At each end of the spring 14 is one of my devices, but only one of them is here shown on account of the limitations of the drawings.

The end of the spring 14 is formed with an eye which is pivoted to the lower end of an oblique swinging shackle comprising a pair of links 16. The upper ends of the links 16 are pivoted to an extension 17 of the lever 18. This lever is pivoted at 19 to a support 20 which is rigidly fastened to the axle 11. An arm 21 of the lever 18 extends downwardly and abuts against the base of the support 20 in the unloaded condition of the vehicle. The upper end of the lever 18 is forked as clearly shown in Fig. 3, and the ends of the two members comprising the forked portion of lever 18 terminate in hooks 22 which support cylindrical bushings 22' to receive trunnions 24 of spring-seat plates 25.

A bracket 26 is secured by integral clamps 27 to the leaf spring 14, preferably, at the place on the leaf spring where the usual binding clip 28 is placed. The bracket 26 is forked as shown in Figs. 4 and 8, and the upper ends of the two forks terminate with semi-cylindrical journals 29 to receive the trunnions 24 of the lower spring-seat plate 25, this lower spring-seat plate being preferably a duplicate of the upper one, turned the other side up. Between the pair of spring-seat plates 25 is a supplementary compression spring 30, adapted to go to a "solid" and non-yielding form at certain positions of the device. The plates 25 are provided with spring-centering extensions or bosses 31 to aid in holding the ends of the springs in proper position on said plates. The plates are also provided with slots 33 on one diameter of the plate through the center of the latter for the passage therethrough of the head of a T-bolt during the operation of assembling the spring 30, and the outer face of the plate will preferably have a detent 34 at right angles to the slot 33 to receive and hold the head of the T-bolt.

The bearing faces of the spring-seat plates 25 are off-set with relation to their trunnions 24 so as to bring these faces of the pair holding a spring farther apart than their trunnions. In this way any cocking or warping action of the spiral spring 30 embraced by a pair of plates tends to correct itself and the axis of the spring tends to keep in a straight line. This prevents the spring from flying out of the embrace of its plates in all positions of the lever 18, and under all conditions of load. This is one of the important features of my invention.

In my former application for patent, previously referred to, the spring-seat plates were hinged near their centers to their supporting members, but in the structure here shown and described the centers of the plates are kept free and unobstructed thereby affording an easy means for assembling the spiral springs under compression sufficient to cause them to hold their positions between their spring-seat plates without any other holding means.

Before each spring is assembled a T-head bolt 36 (see Fig. 8) is inserted through the slots in the two end-plates and a nut 37 is screwed up on the bolt till the compression spring is short enough to permit of the plates with their trunnions being placed inside of their respective hooks 22 and 29. The nut is then unscrewed and the T-head bolt removed after turning it through a quarter revolution. Fig. 8 shows the spring under compression by means of bolt 36 and in position between the forks of lever 18 and bracket 26, and Fig. 4 shows the same parts in their positions after the bolt 36 has been removed.

Fig. 5 shows the adaptation of my invention to leaf springs as the same are commonly used in automobile construction, the lever being pivoted to a standard supported by the frame of the machine.

In the modification shown in Fig. 6 the inner spring-seat plate is supported by a bracket which may be considered as having an elongated support from the leaf spring, or it may be considered as showing its support from the vehicle-body.

Having thus fully described my invention, what I claim as new and wish to secure by Letters Patent of the United States, is—

1. In a vehicle, a spirally wound compression spring, a pair of plates between which the spring is compressed said plates having trunnions, the trunnions of one plate being closer to the trunnions of the other plate than said plates are to each other, and trunnion supports, the trunnion supports for at least one of said plates having angular movement under varying conditions of load and strain.

2. In a vehicle, a spirally wound compression spring, a pair of plates between which the spring is compressed, said plates having trunnions, the trunnions of one plate being closer to those of the other plate than said plates are to each other, and trunnion supports, those for each plate being variable in distance and angular relation to those of the other plate under varying conditions of load and strain.

3. In a vehicle, a spirally wound compression spring, a pair of plates between which the spring is compressed each of said plates having a pair of outwardly extending diametrically opposed trunnions and also having bolt holes, bearings to receive and support the trunnions of each pair of plates, and means passing through the bolt holes in the plates to draw the plates together and compress the spring while the trunnions are being assembled in their bearings.

4. In a vehicle, a spirally wound compression spring, a pair of plates between which the spring is compressed each of said plates having a pair of outwardly extending trunnions and also having bolt slots through the centers of the plates, bearings to receive and support the trunnions of each pair of plates and T-bolts to draw the plates together for assembling the trunnions in their support.

5. In a vehicle, a lever, a leaf spring connected at one end to the lever, a spirally wound compression spring, a pair of plates between which the spirally wound spring is compressed said plates having trunnions the trunnions of one plate being closer to the trunnions of the other plate than said plates are to each other, and said lever supporting the trunnions of one of said plates.

6. In a vehicle, a lever, a leaf spring connected at one end to the lever, a spirally wound compression spring, a pair of plates between which the spirally wound spring is compressed said plates having trunnions the trunnions of one plate being closer to the trunnions of the other plate than said plates are to each other, the trunnions of one plate being supported by the lever and the trunnions of the other plate being supported from the leaf spring.

In witness whereof, I have hereunto set my hand and seal at Indianapolis, Indiana, this 13th day of August, A. D. one thousand nine hundred and thirteen.

ROBERT H. HASSLER. [L. S.]

Witnesses:
JOSEPH A. MINTURN,
W. T. KALER.